United States Patent [19]
Anderson

[11] Patent Number: 5,282,245
[45] Date of Patent: Jan. 25, 1994

[54] TUBULAR BI-DIRECTIONAL MICROPHONE WITH FLARED ENTRIES

[75] Inventor: Carl R. Anderson, Wilmette, Ill.

[73] Assignee: Shure Brothers, Incorporated, Evanston, Ill.

[21] Appl. No.: 861,924

[22] Filed: Apr. 1, 1992

Related U.S. Application Data

[63] Continuation-in-part of Ser. No. 566,974, Aug. 13, 1990, abandoned.

[51] Int. Cl.⁵ .......................... H04M 1/00; H04R 25/00
[52] U.S. Cl. ..................................... 379/433; 381/155; 381/157; 381/168; 381/169
[58] Field of Search ................. 379/433; 381/150, 155, 381/156, 157, 158, 154, 168, 169, 188, 183, 187; 455/89, 90

[56] References Cited

U.S. PATENT DOCUMENTS

| | | | |
|---|---|---|---|
| 1,235,510 | 7/1917 | Tigerstedt | 381/157 |
| 2,627,932 | 2/1953 | Volkmann et al. | 381/169 |
| 2,790,164 | 4/1957 | Oberg | 381/156 |
| 3,585,317 | 6/1971 | Dvorsky | 381/155 |
| 4,009,355 | 2/1977 | Poradowski | 381/155 |
| 4,232,205 | 11/1980 | Ribeyre | 381/169 |
| 4,768,614 | 9/1988 | Case | 381/169 |
| 4,817,163 | 3/1989 | Stastny | 381/150 |

*Primary Examiner*—Jin F. Ng
*Assistant Examiner*—Jason Chan
*Attorney, Agent, or Firm*—Allegretti & Witcoff, Ltd.

[57] ABSTRACT

A bi-directional noise-cancelling microphone comprising a detector for detecting acoustical signals centrally positioned within a tubular member that has flared entries. The microphone provides a bi-polar response pattern, and effectively cancels unwanted noise incident upon the microphone at the sides of the tubular member, as well as noise above a particular frequency dictated by the length of the tubular member. By providing flared entries to the tube, the maximum peak response frequency of the microphone is extended up to 40% higher than that achieved with a similar tubular member with non-flared entries. An embodiment of the tubular bi-directional microphone with flared entries is disclosed wherein the microphone is provided with a two-stage pop filter system. The pop filter system includes a first screen covering the front entry of the microphone housing. A second screen is constructed so as to vent the first screen, thereby preventing pop signals from being produced.

10 Claims, 7 Drawing Sheets

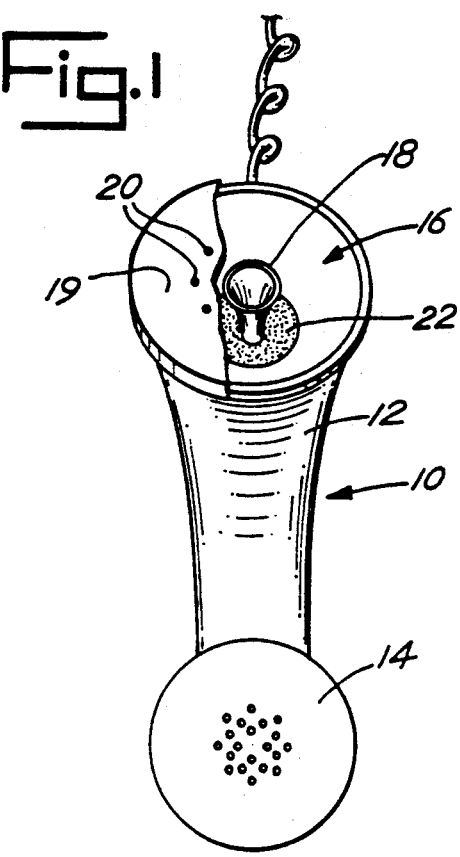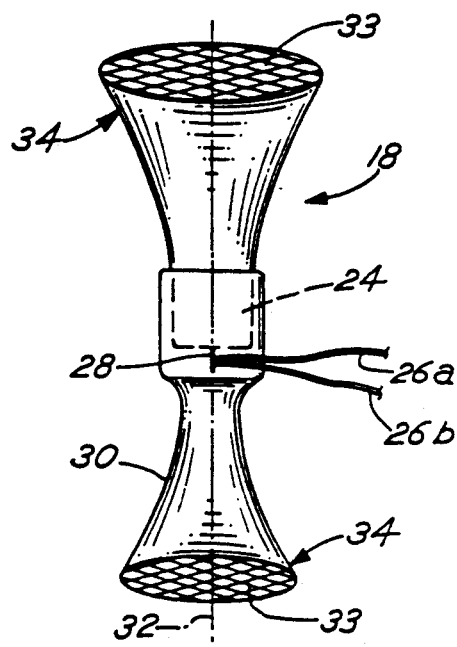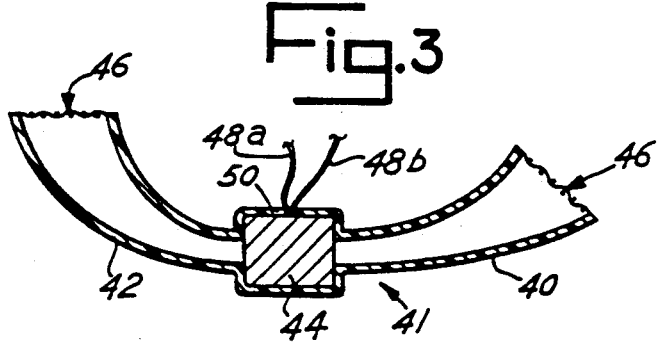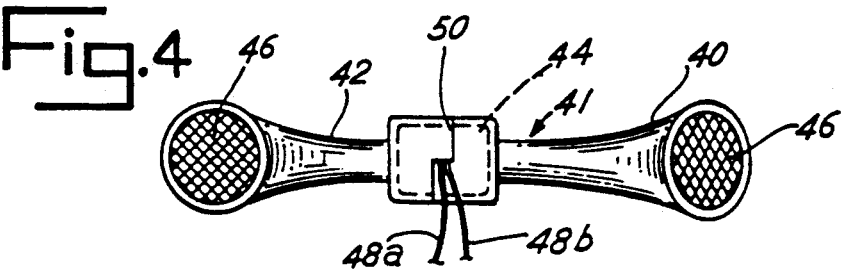

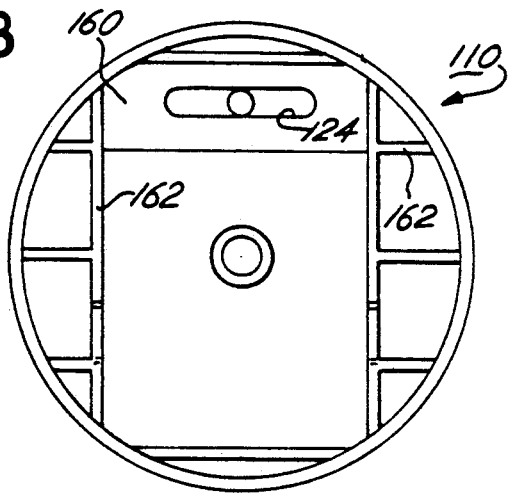
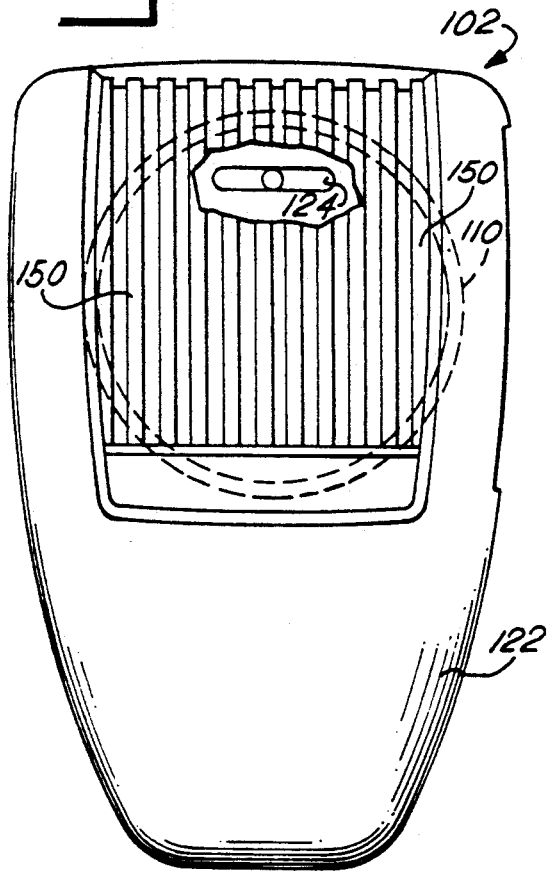
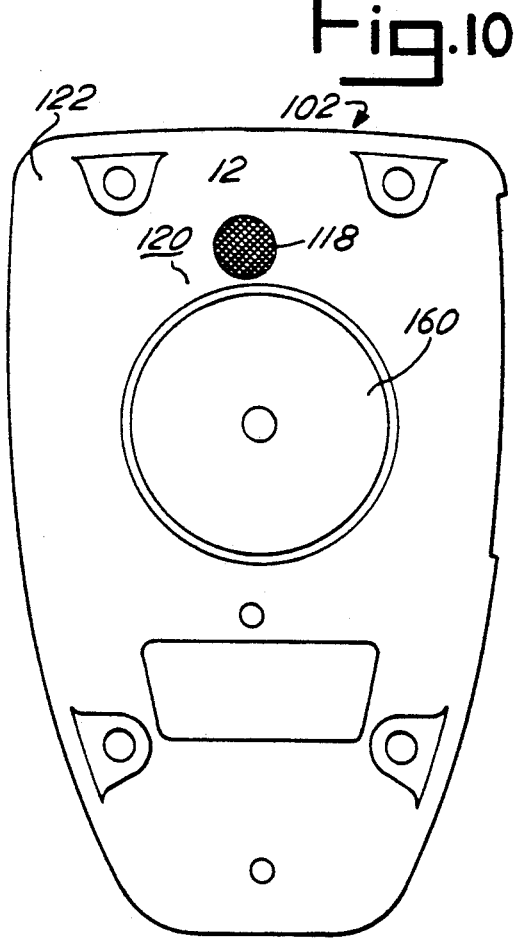

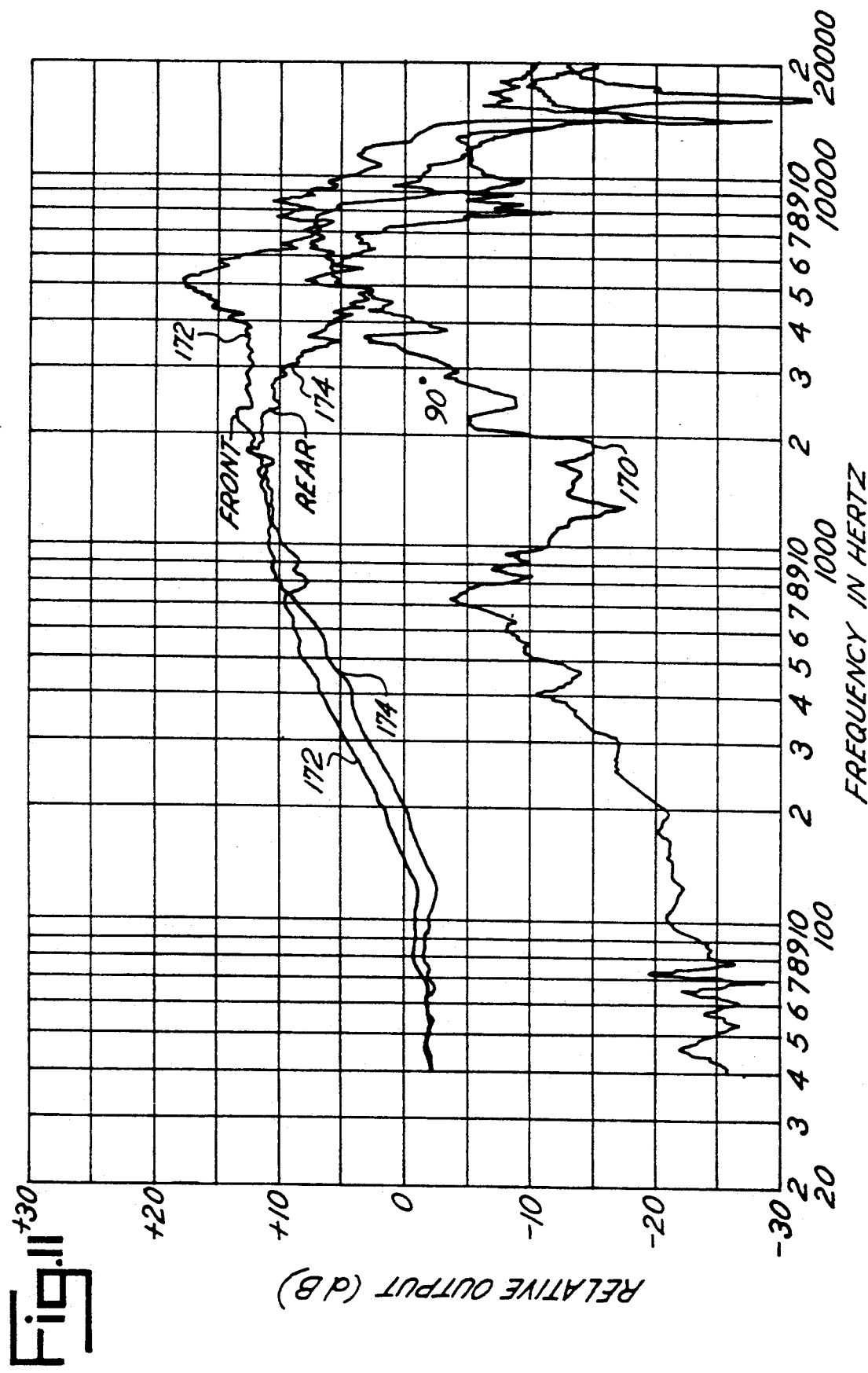

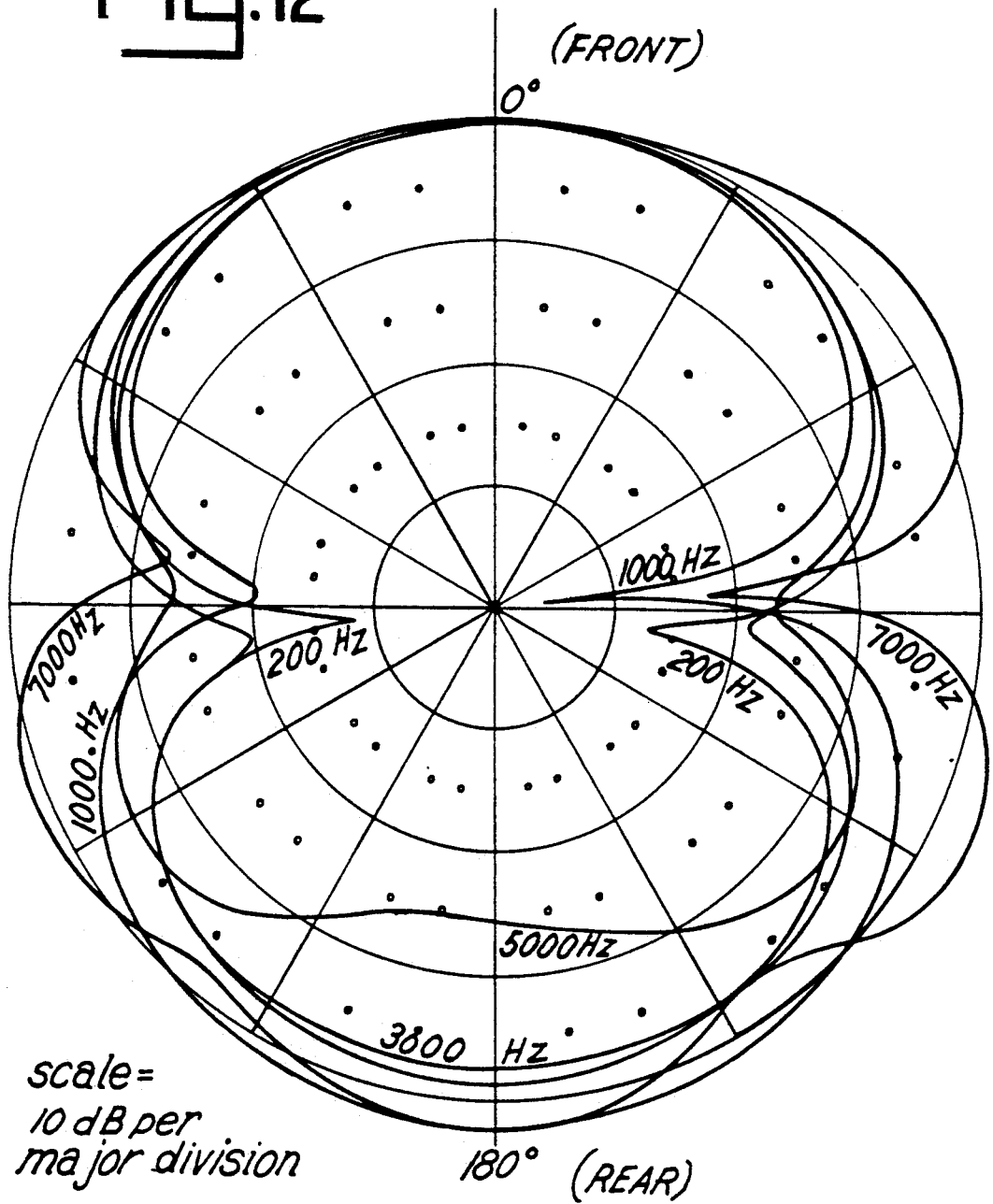

TUBULAR BI-DIRECTIONAL MICROPHONE WITH FLARED ENTRIES

RELATED APPLICATION

This is a continuation-in-part application of Ser. No. 07/566,974, filed Aug. 13, 1990, now abandoned.

BACKGROUND OF THE INVENTION

This invention relates generally to noise-cancelling microphones. More particularly, this invention relates to a bi-directional noise-cancelling microphone that provides a broad frequency band of noise cancellation.

Microphone units typically operate in environments where unwanted acoustical components of incident sound waves are present. For example, a person listening to someone talking on the telephone may be distracted from the speaker's voice by sounds emanating from machinery, traffic, appliances, or other ambient sounds, if the person is talking into a phone without a noise-cancelling microphone.

Noise-cancelling microphones depend upon two factors for their operation. The first factor is the polar pattern of the microphone (usually bi-directional) and the assumption that the noise to be reduced is not on the maximum sensitivity axis of the microphone. The second factor is the difference in operation of a two-entry microphone for a sound source close to one entry and a sound source at a distance to the microphone.

When the sound source is close to one entry, the sound pressure will be several times greater at the close entry than at the remote entry. Since the microphone responds to the difference of sound pressure at the two entries, close talking will provide a substantially higher sensitivity than a remote sound, where the sound pressure is equal in magnitude at the two entries.

Small microphones with tubular sound entries have been used for some time, particularly in hearing aids. This has the advantage that the sound entries may be placed in an appropriate location on the hearing aid case without regard to accommodating the bulk of the microphone cartridge. Additionally, the tubes need not be straight, but may have unsymmetrical bends. Typically, the tubes are of approximately equal length.

There are two acoustic parameters which affect the output. The first is the distance between entries. The maximum acoustic input will occur at the frequency where the distance between the entries is a half wavelength. Ordinarily, this distance will be between ¼" and 3", with the shorter distances giving higher peak frequencies and lower general noise sensitivity.

The other parameter is the total length of the microphone tube. When this distance is a half wavelength, the two halves of the tube will exhibit ¼ wave "organ pipe" resonances which determine the highest practical frequencies passed to the microphone element.

Since the total length of the tube is always the same or larger than the distance between the entries, the tube length determines the maximum practical frequency response, both for noise and for a close talking sound source at one entry of the microphone.

In the practical use of this microphone, especially in a retrofit to an existing case, the total tube length can become 3 or 4 inches, which would restrict the frequency response to 2 KHz or lower. This is an unfortunate restriction, since much information is contained in high frequency sibilant sounds.

Two attempts in the prior art to produce noise-cancelling microphones are illustrated in U.S. Pat. No. 3,995,124, issued to Gabr, and U.S. Pat. No. 4,950,016, issued to Groves, et al. In the Gabr patent, the sound responsive element of the microphone, a diaphragm, is designed to have both of its sides exposed substantially equally to unwanted noise. In the Groves, et. al. patent, separated sound paths are provided from the exterior of a telephone handset to the front and rear surfaces of a diaphragm, thereby reducing the effect of unwanted noise signals. Neither of these patents suggests the unique noise-cancelling microphone of this invention.

SUMMARY OF THE INVENTION

The present invention provides a tubular bi-directional microphone comprising an elongate tubular member and a means for detecting acoustical signals positioned within the tubular member. The tubular member has front and rear entries which are flared. In one aspect of the invention, the microphone is mounted in a housing for a telephonic instrument which incorporates a two-stage pop filter for preventing pop signals from being produced by the detector.

In another aspect of the invention, the tubular member defines a central axis and the tubular member has a rear entry which is flared and the front entry is flared only along a plane containing a central axis to have a uniform height and a flared width.

The present invention provides a noise-cancelling microphone that eliminates the cost and complexity of the microphones illustrated in the Gabr and Groves, et. al. patents. Any given length of tube has a peak frequency above which the microphone response drops off rapidly. However, when the entries of the tube are tapered and given a flared or horn shape, the peak frequency is extended to frequencies up to 40% higher than what a straight or unflared tube of the same length would produce.

The flared entries may have bends as necessary to fit or retrofit them into a given space. The entries need not be of a circular cross section and may be made of a wide range of materials formable into the required shape.

An object of this invention is to produce a tubular bi-directional noise-cancelling microphone that has the capability of a broad frequency band of noise cancellation.

Another object of the invention is to produce a tubular bi-directional noise-cancelling microphone that has flared ends thereby extending the high frequency peak beyond that obtained with a tubular microphone with non-flared ends.

A further object of the invention is to produce a bi-directional noise-cancelling microphone that is low cost, light weight, simple to manufacture, and capable of a wide variety of uses.

A further object of the invention is to produce a microphone instrument incorporating a bi-directional noise-cancelling microphone which has a built in two-stage pop filter system which prevents unwanted pop signals from being produced by the microphone.

A still further object of the invention is to produce a noise-cancelling microphone easily retrofittable to existing applications, for example, to headset boom-mounted microphones, or telephone handsets.

These and other features, advantages, and objects of the invention will become more apparent from the following detailed description.

BRIEF DESCRIPTION OF THE DRAWINGS

There is shown in the drawing a presently preferred embodiment of the present invention, wherein like numerals in the various views refer to like elements and wherein:

FIG. 1 is a perspective view of a telephone handset incorporating the bi-directional noise-cancelling microphone according to the present invention;

FIG. 2 is a partial cut away perspective view of the bi-directional noise-cancelling microphone shown in FIG. 1;

FIG. 3 is a cross-section view of a bi-directional noise-cancelling microphone having bent entries;

FIG. 4 is an end view of the bi-directional noise-cancelling microphone of FIG. 3;

FIG. 8 is a side elevational view of the funnel plate defining the front entry of the tubular bi-directional microphone of FIG. 6;

FIG. 9 is a frontal view of the instrument of FIG. 6;

FIG. 10 is a rear view of the instrument of FIG. 6;

FIG. 11 is a graph of the free field (distant) response of the instrument of FIG. 6 as a function of frequency for sound sources located at 0, 90, and 180 degrees from an axis defined by the elongate tubular member of the bi-directional microphone;

FIG. 12 is a graph of the free field (distant) polar characteristics of the instrument of FIG. 6.

DETAILED DESCRIPTION OF THE PREFERRED EMBODIMENT

Figure 5:
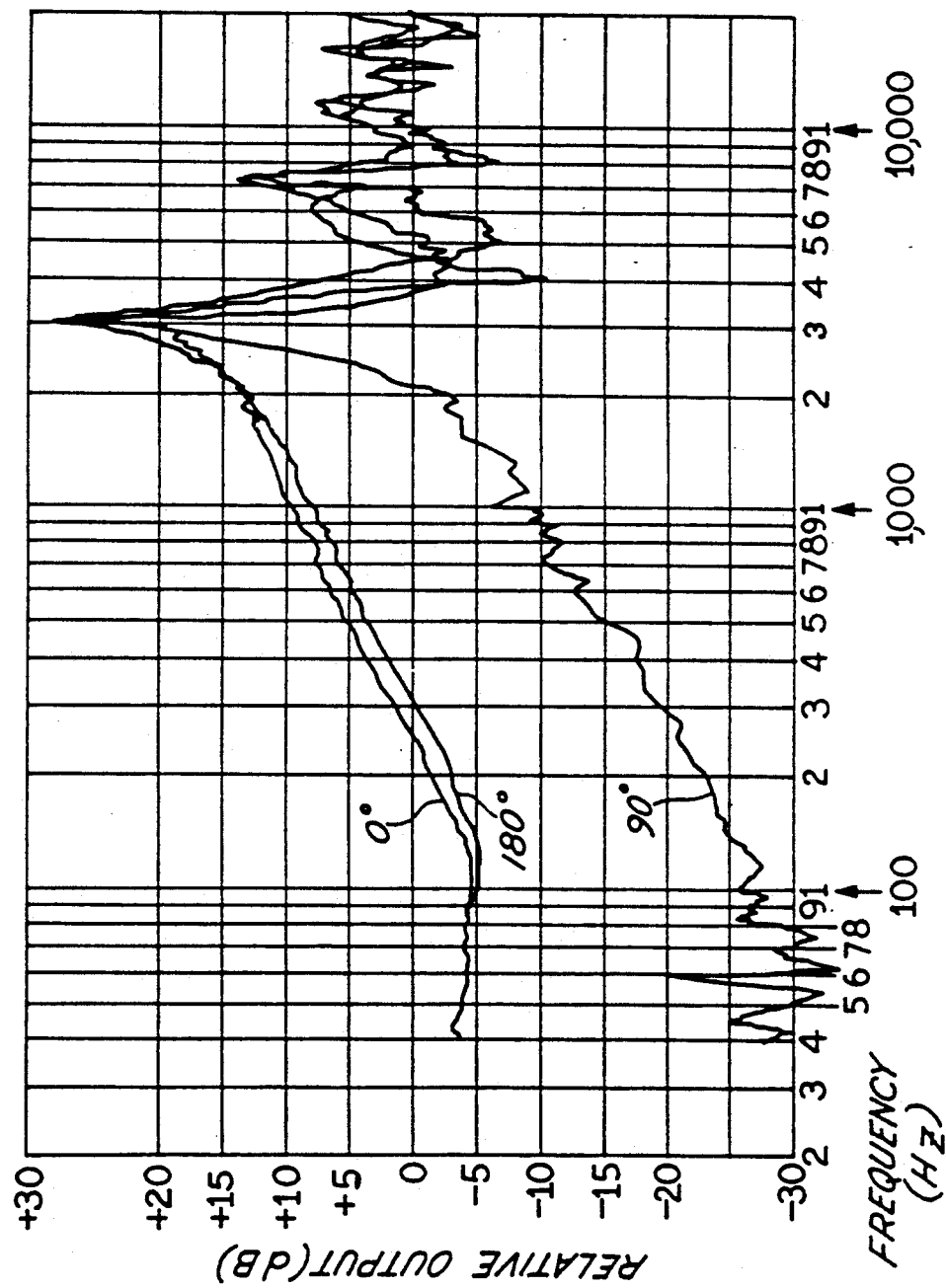
FIG. 5 is a graph of the response of the bi-directional noise-cancelling microphone as a function of frequency for the microphone of FIG. 2.

Referring to FIG. 1, a telephone handset is depicted which incorporates the bi-directional noise-cancelling microphone of the present invention. The telephone handset 10 has a housing 12, a receiver 14 that incorporates a speaker, and a transmitter or speaking element 16 that incorporates a bi-directional noise-cancelling microphone 18. The transmitter 16 has a housing portion 19 that is provided with small apertures 20 that permit sound to pass through the housing to the microphone 18. The microphone 18 is oriented so that one end is pointed toward the apertures 20 and the source of the desired sound. A mounting baffle 22 secures the microphone 18 to the housing 12 of the handset 10. The housing also is provided with similar apertures (not shown) on the opposite side of the handset so that the other end of the microphone can receive acoustical signals and thereby function bi-directionally.

Referring now to FIG. 2, the microphone of FIG. 1 is shown isolated and in perspective view. The microphone 18 is comprised of a detector of acoustical signals such as a unidirectional electret microphone cartridge 24 with leads 26a and 26b that pass through a slit 28 in the elongate tubular member 30. The detector 24 is positioned approximately in the center of the elongate tubular member 30. The elongate tubular member 30 is substantially circular in cross section perpendicular to the central axis 32. The length of the elongate tubular member or tube 30 can vary depending on the application and the frequency peak desired, with a shorter tube providing a relatively higher frequency peak. The elongate tubular member 30 need not be circular in cross section, and can be bent to fit into a given space. A polyester cloth screen 33 is cemented over the ends of the elongate tubular member 30 to keep moisture and debris out of the elongate tubular member 30 and to provide acoustic damping.

The elongate tubular member 30 shown in FIG. 2 has flared or horn shaped ends that provide up to a 40% increase in the frequency peak over an unflared tubular member of the same length. The inside diameter of the tubular member 30 increases from ⅛" adjacent to the detector to ¼" at the flared ends 34 of the tubular member 30. The shape of the flare can, of course, vary. However, an exponential or non-linear increase in the inside diameter of the tubular member between the detector and the flared ends 34 of the tube is shown in the preferred embodiment depicted in FIG. 2. Preferably, the elongate tubular member 30 increases from a minimum value adjacent to detector 24 substantially exponentially to a maximum value at the flared ends. Further, the inside diameter of the elongate tubular member 30 at the flared end is at least twice the inside diameter of the elongate tubular member 30 adjacent the detector 24. By choosing a pliable material such as plastic or rubber for the elongate tubular member 30, the desired amount of flare can be readily achieved, and the microphone can be easily installed or retrofitted to existing applications.

Referring now to FIG. 3, an alternative embodiment 39 of the present invention is shown in cross section along a longitudinal axis of the tubular member. The elongate tubular member 41 of FIG. 3 comprises two entry elements 40 and 42. The entries 40 and 42 are given bends as necessary to fit into a given space. The detector 44 is shown positioned between the non-flared ends of the first and second entry elements 40 and 42. As is the case with the embodiment of FIG. 2, the shape of the flared ends of the entry elements of FIG. 3 can vary, but an exponential shape is shown in FIG. 3. In one present form, the inside diameter of the flared ends 46 is ¼", and the inside diameter adjacent the detector is 1/16". The detector 44, for example, an electret cartridge, has leads 48a and 48b that are brought out through the joint 50 between the first and second entries. The first and second entries 40 and 42 are interlockingly secured together in any well-known manner, for example, by telescoping the ends together.

FIG. 4 shows an end view of the bi-directional noise-cancelling microphone of FIG. 3. The detector 44 is shown positioned securely in the narrowest portion of the elongate tubular member 41 comprising first and second entries 40 and 42, with the leads 48a and 48b extending out away from the inside of the tubular member at the joint 50 so as to not interfere with the detection of sound.

FIG. 5 is a logarithmic graph of microphone response as a function of frequency for an acoustical source placed at 0°, 90° and 180° from an axis lying along the central axis of an elongate tubular member with flared entries. For an elongate tube member of 2.85 inches overall length and flared entries increasing from ⅛" to ¼" inside diameter, the peak response at approximately 3,100 Hz is at an approximately 40% higher frequency than the peak frequency a straight tubular member without flared ends would provide. Note also how the microphone response drops markedly for frequencies above 3,100 Hz. The microphone response to sound incident at 180° and 0° is nearly the same, illustrating the bi-directional polar pattern of the microphone. A pronounced separation between the 0° and 180° curves and the 90° curve over a broad band of frequencies is also shown, indicating that unwanted, ambient noise of most frequencies incident upon the microphone at the sides of the tubular member is effectively cancelled.

The microphone of the present invention is ideally suited for applications where the desired acoustical signal is incident upon the microphone at either of the ends. For example, the microphone could be vertically disposed adjacent the chin and spoken over the front entry. Alternatively, the microphone could be located on a boom headset arrangement with the microphone extending horizontally over the boom attachment. As another alternative, the microphone could be boom mounted and oriented toward any acoustical source. The feature of dual, flared entries can be adapted for larger microphones with a variety of possible means for detecting acoustical signals, and still provide the desired noise-cancelling effect with the frequency extension provided by the flared entries.

Figure 6:
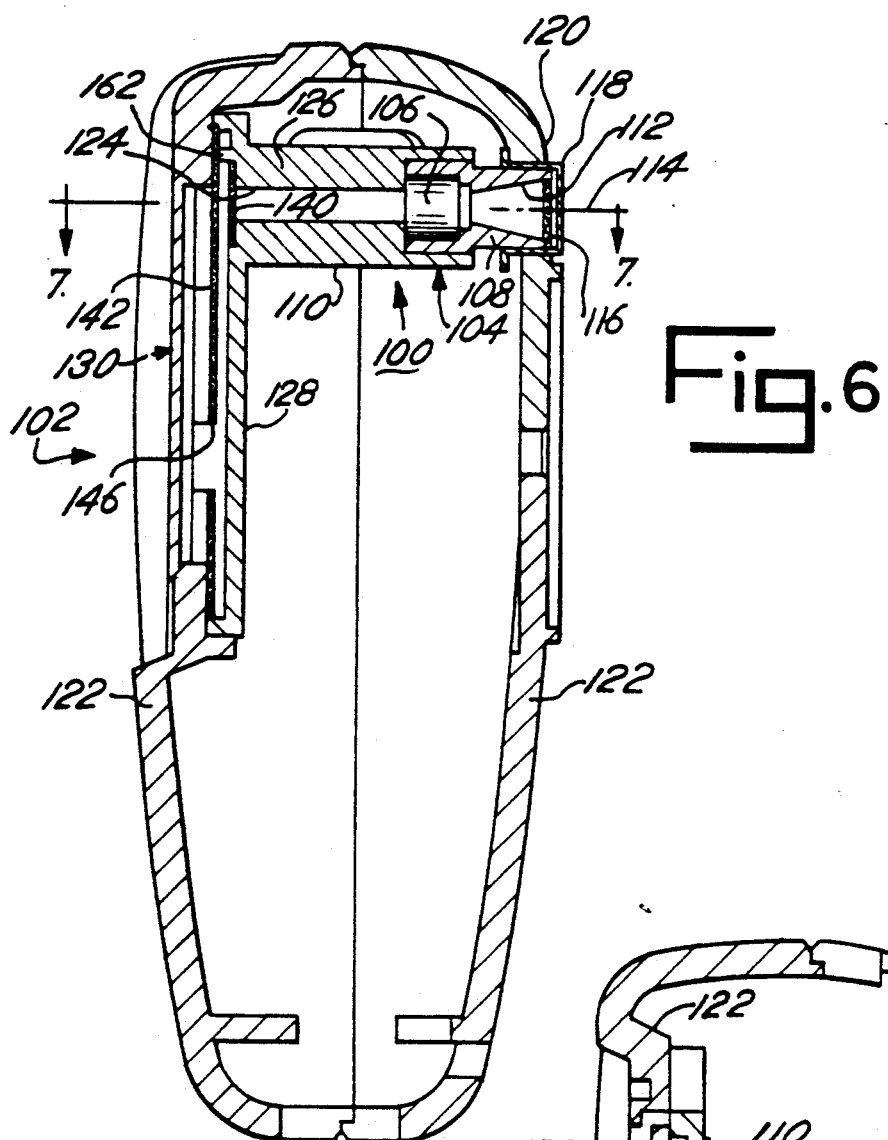
FIG. 6 is a cross-sectional view of a microphone instrument incorporating a tubular bi-directional microphone and a two-stage pop filter system.

An alternative embodiment of the invention providing nearly ideal noise-cancelling characteristics is illustrated in FIGS. 6-10. Referring to FIG. 6, a tubular bi-directional microphone 100 is shown installed in a telephonic instrument 102 for transmitting acoustical signals such as a hand-held microphone. The tubular bi-directional microphone 100 has an elongate tubular portion 104 and an electret cartridge 106 positioned within the elongate tubular portion 104. The tubular portion 104 consists of a funnel tube 108 and a funnel plate 110. The funnel tube 108 defines a rear entry 112 which is flared. In the embodiment of FIG. 6-10, the rear entry 112 is provided with a linear flared shape and has a circular cross section in a plane perpendicular to central axis 114.

Still referring to FIG. 6, the cartridge 106 has about its own length of additional time delay built into the rear entry. Thus, the cartridge 106 is mounted towards the rear of the tubular portion 104 so that the total delay in the front entry 124 and the rear entry 112 is approximately equal. This insures that the response of microphone 102 has a null at 90 degrees from the center axis 114.

A screen 116 of 0.020 inch hydrophobic material is placed over the rear entry 112, and a grille cap 118 covers the screen 116. The grill cap 118 protrudes slightly beyond the rear surface 120 of the instrument housing 122 to prevent the operator's fingers from inadvertently covering the rear entry 112.

The funnel plate 110 has a tubular body portion 126 and a plate portion 128. The tubular body portion 126 is given a shape such that it defines a flared front entry 124. As can be seen from FIGS. 6-8, the tubular body portion 126 defines a flared entry 124 which is of uniform height, but tapered or flared width. Preferably, the width is flared linearly in a horizontal plane containing the center axis 114. The plate portion 128 is secured to housing 122 and also serves to block the front aperture or opening 130 in the housing.

The microphone construction shown in FIG. 6 includes a two-stage pop filter system which is designed to eliminate undesirable pop signals from being produced by the detector 106. The system includes a first screen 140 covering the front entry 124 and a second screen 142 covering the front aperture 130 (FIG. 7) of the housing 122. The first and second screens 140 and 142, respectively, are preferably 0.020 inch hydrophobic material, and are cemented or otherwise secured to the funnel plate 110. The important feature of the two screens is that the second screen 142 provides a means for venting the first screen 140. This venting can be done by providing in the second screen 142 an opening 146 to the atmosphere. Alternatively, the venting can be accomplished by making the second screen 142 sufficiently large in size relative to the first screen 140 such that a pop signal can not exist uniformly over the full second screen 142. In this alternative, the unpopped area of the second screen 142 acts as a vent for the popped area. Thus, having eliminated most of the gross air movement by venting the second screen 142, the first screen 140 can effectively manage any residual air movement. These two approaches can be, of course, combined, as illustrated in FIG. 6, wherein the second screen 142 has an opening 146 and at the same time is constructed significantly larger than the first screen 140, for example, at least twice the area of the first screen, in order to provide maximum venting characteristics.

Figure 7:
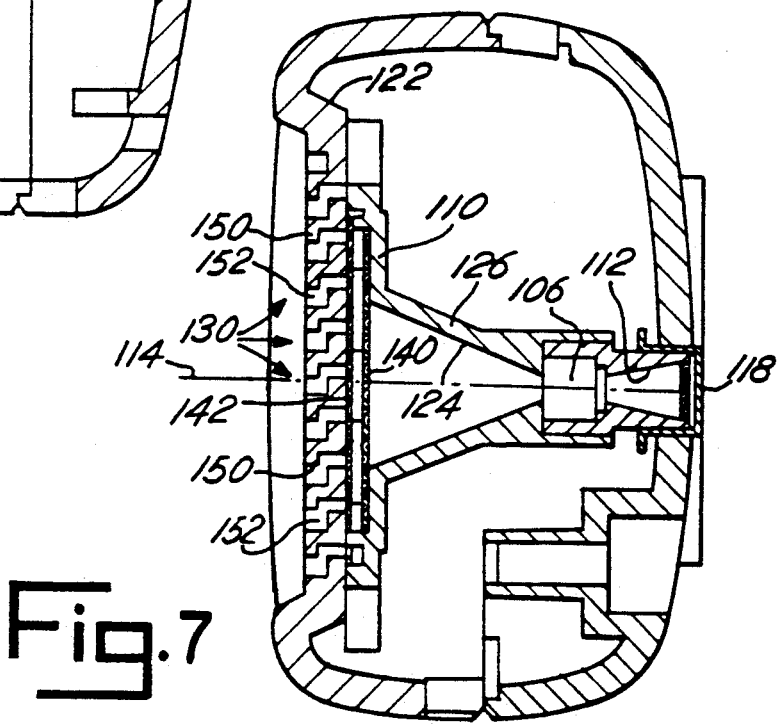
FIG. 7 is a horizontal cross-sectional view of the instrument of FIG. 6, showing the flared entries of the tubular bi-directional microphone.

Referring now to FIG. 7, the instrument of FIG. 6 is shown in horizontal cross-section in a plane containing center axis 114. The flared width of the front entry 124 is clearly shown. The housing 122 is provided with a plurality of vertical Z-shaped grooves 150 which effectively break up the front aperture 130 into a plurality of zigzag passages 152. This zigzag design serves to minimize gross air movement impinging on the second screen 142.

Referring now to FIG. 8, the funnel plate 110 is shown isolated as seen from the front in a side elevational view. The tubular body portion 126 (FIG. 6) defines a flared entry 124 of uniform height and tapered width. The first screen 140 (FIG. 6) is cemented over recessed region 160 adjacent to the opening of the flared entry 124. The second screen 142 (FIG. 6) is cemented over the ribs 162.

FIG. 9 is front elevational view of the instrument 102 of FIG. 6, with a portion of the vertical Z-shaped grooves 150 broken away to show the front flared entry 124. The outline of the funnel plate 110 is shown in dashed lines.

Referring to FIG. 10, the microphone instrument 102 of FIG. 6 is shown as seen from the rear. Grille cap 118 covers the rear entry 112 (FIG. 6). A hang up button 160 is provided in the housing 122 which slips over complimentary tangs (not shown) on a transceiver unit (not shown) for the instrument.

Figure 13:
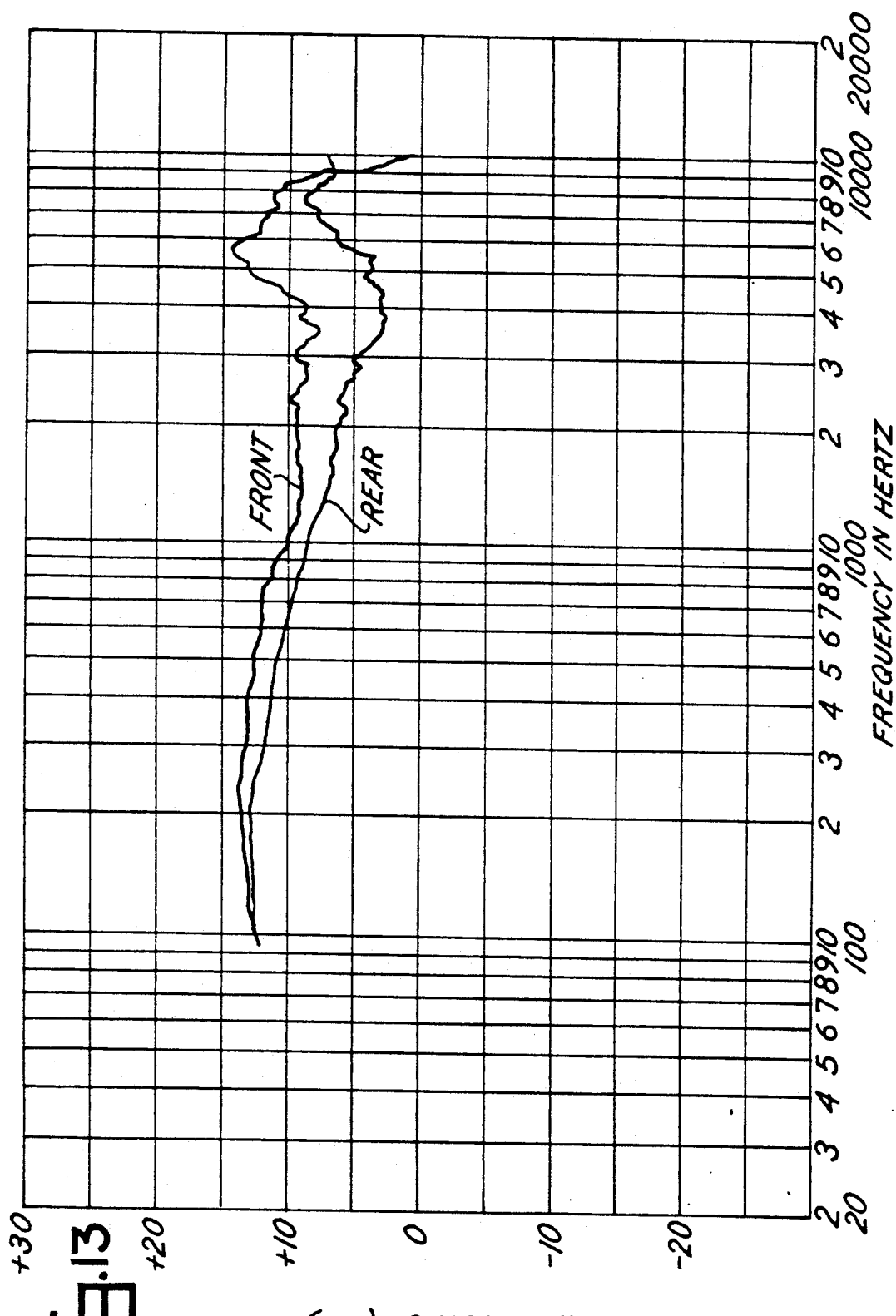
FIG. 13 is a graph of the close talking response (1 cm) as a function of frequency for the instrument of FIG. 6.

Referring now to FIG. 11, there is shown a graph of the free field response curves of the instrument 102 of FIG. 6 as a function of frequency for sound sources located at 0° (i.e., front), 90°, and 180° from the central axis 114 of the microphone 100 (FIG. 6). Note that the 90° response curve 170 stays down over the useful frequency range. The front response 172 shows a mild rise to the 5 KHz level, but the polar pattern does not expand at 5 KHz as might be expected. Rather, a remarkable and advantageous result occurs. The rear response curve 174 decreases to a level about 15 dB below the front response curve 172. This result is further borne out in FIG. 12, which is a graph of the polar response characteristics of the microphone of FIG. 6 at frequencies of 200, 1000, 3000, 5000 and 7000 Hz. Note that the curves of FIG. 12 show a well behaved bi-directional response below 3 KHz, and a tendency of the rear response to split into lobes at higher frequencies. This lobing is predicted for a symmetrical bi-directional microphone when the distance between entries exceeds one-half the wavelength of the incident sound, but, as FIGS. 11 and 12 illustrate, this lobing only occurs on the rear lobe. FIG. 13 shows the close talking response curves. The microphone has a mild excess of low frequency response for a close talking application, but the high frequency roll-off in the rear response shown on the free field curves carries over to the close talk condition. The basic curves of FIGS. 11-13 can of course be readily modified by mild equalization to become ideal for a noise-cancelling microphone.

While I have shown presently preferred embodiments of the present invention, it will be understood that the invention may be otherwise embodied within the true spirit and scope of the invention. For example, many other possible structures may be employed for providing flared entries for a tubular bi-direction microphone, and for providing a two-stage pop filter system. Moreover, the two-stage pop filter system may be used in bi-directional noise-cancelling microphones which do not have flared entries. This true spirit and scope of the invention is defined by the appended claims, interpreted in light of the foregoing specification.

I claim:

1. An instrument for transmitting acoustical signals, comprising:
   a housing having means for defining front and rear apertures permitting transmission of acoustical signals through said housing from two opposing directions; and
   a first order tubular microphone mounted within said housing comprising an elongate tubular member and a means for detecting acoustical signals positioned within said elongate tubular member, said elongate tubular member having front and rear entries for said detector means which are flared; and
   a two-state pop filter for said microphone comprising a first screen covering said front entry and a second screen covering said front aperture of said housing, said second screen being provided with an opening for venting said first screen, the area of said second screen being more than twice the area of said first screen.

2. The instrument as claimed in claim 1 wherein said second screen being sufficiently large in size relative to said first screen such that a pop signal will not normally exist uniformly over said second screen to thereby vent said first screen.

3. The instrument as claimed in claim 1 wherein said detector means is mounted within said elongate tubular member such that the response curve of said microphone has a null at approximately 90 degrees.

4. The instrument as claimed in claim 1 wherein said elongate tubular member comprises a rear funnel means for defining said flared rear entry and front funnel means for defining said flared front entry, said front funnel means defining said flared front entry such that said front entry is of a uniform height and flared width.

5. The instrument as claimed in claim 4 wherein said front and rear flared entries are exponentially flared.

6. The instrument as claimed in claim 4 wherein said front and rear entries are linearly flared.

7. The instrument as claimed in claim 6 wherein said front funnel means comprises a funnel plate comprising a tubular body portion defining said flared front entry and a plate portion adjacent said front aperture in said housing.

8. The instrument as claimed in claim 7 wherein said first and second screens are mounted on said plate portion.

9. The instrument as claimed in claim 8 wherein said second screen is sufficiently large in size relative to said first screen such that a pop signal will not normally exist uniformly over said second screen to thereby vent said first screen.

10. The instrument as claimed in claim 1 wherein said instrument further comprises a rear screen covering said rear entry and a grille cap covering said rear screen.

* * * * *